United States Patent [19]

Toshio et al.

[11] Patent Number: 4,869,288

[45] Date of Patent: Sep. 26, 1989

[54] BACK PRESSURE VALVE

[75] Inventors: Kamimura Toshio; Ito Koji, both of Gifu, Japan

[73] Assignee: Teijin Seiki Co., Ltd., Osaka, Japan

[21] Appl. No.: 193,406

[22] Filed: May 12, 1988

[30] Foreign Application Priority Data

May 14, 1987 [JP] Japan .................................. 57-072280

[51] Int. Cl.$^4$ .............................................. F16L 55/07
[52] U.S. Cl. ..................................... 137/494; 138/31; 92/117 A
[58] Field of Search .......................... 137/494; 138/31; 92/117 A

[56] References Cited

U.S. PATENT DOCUMENTS

| | | | |
|---|---|---|---|
| 2,754,847 | 7/1956 | Ashton et al. | 138/31 |
| 3,863,676 | 2/1975 | Tarsha | 138/31 |
| 4,000,758 | 1/1977 | Meisenheimer, Jr. | 138/31 |
| 4,138,846 | 2/1979 | Sakakibara | 138/31 X |
| 4,217,758 | 8/1980 | Bach et al. | 138/31 X |

*Primary Examiner*—John Rivell
*Attorney, Agent, or Firm*—Burgess, Ryan & Wayne

[57] ABSTRACT

A back pressure valve accumulates therein a predetermined amount of fluid having pressure higher than a predetermined level.

The back pressure valve comprises a casing having a chamber formed therein, which chamber is communicating with an inlet port and an outlet port, a piston which is slidably installed in the casing, an elastic member which urges the piston toward the inlet port, and a relief valve which opens when pressure in the chamber exceeds a predetermined pressure level so as to permit flow of fluid from the inlet port to the outlet port.

The back pressure valve further comprises a cylindrical piston which is slidably inserted between an outer periphery of the piston and an inner periphery of the casing, and an outer elastic member which urges the cylindrical piston toward the inlet port.

The back pressure valve minimizes occurrence of trouble due to clogging of contaminations though it is simple in construction and inexpensive.

2 Claims, 1 Drawing Sheet

BACK PRESSURE VALVE

DETAILED DESCRIPTION OF THE INVENTION

1. Technical Field to which the Invention Relates

This invention relates to a back pressure valve, which accumulates therein a predetermined amount of fluid having pressure higher than a predetermined level.

A back pressure valve is generally disposed in a fluid exhausting line. Such a back pressure valve is used in order to serve actuator with back pressure at a predetermined level after fluid source stops. In addition, the back pressure valve feeds accumulated fluid to the actuator in order to provide air from being sucked in the actuator when there is danger that the actuator may suck air as it vibrates.

2. Prior Art

An example of a conventionally known back pressure valve 1 is illustrated in FIG. 2.

In FIG. 2, reference numeral 2 designates a casing which has a chamber 3 formed therein. The casing 2 has an inlet port 4 formed at the front end thereof and communicating with the chamber 3, and the casing 2 also has an outlet port 5 formed at the rear end thereof and communicating with the chamber 3.

A piston 6 is slidably installed in the chamber 3 of the casing 1, and a spring 7 is disposed between the piston 6 and the rear wall of the chamber 3 so as to urge the piston 6 toward the inlet port 4.

A relief valve, which is illustrated by a symbol and which is generally designated by reference numeral 8, is disposed in the piston 6. The relief valve 8 opens when the piston 6 abuts a shoulder 9 formed on the periphery of the chamber 3, after the piston 6 moves toward the outlet port 5 against the spring force of the spring 7 so as to accumulate within the chamber 3 a predetermined amount of fluid with pressure higher than a predetermined level, which is set by the relief valve 8. Then, the fluid flows from the inlet port 4 to the outlet port 5 through the relief valve 8 and the chamber 3.

Problems to Be Solved by the Invention

However, in such a conventional back pressure valve 1, contaminants which are contained in the fluid may lodges between the casing 2 and the piston 6. When such clogging occurs, the piston 6 will not move. Accordingly, the back pressure valve 1 cannot perform its required functions. Therefore, there occur inconveniences that air is sucked in the actuator.

Especially, when the back pressure valve 1 is installed on an aircraft, the above-described stop of the function may invite the aircraft serious conditions. In order to overcome such accident, conventionally, two back pressure valves have been prepared. As a result, if one of the back pressure valves stops its function, the remaining back pressure valve can prevent air from being sucked into the system.

According to the above-described conventional method, i.e., installation of two back pressure valves, however, the structure becomes complicated, and the cost of the equipment becomes high.

Objects of the Invention

An object of the present invention is to provide a back pressure valve which can obviate the above-described problems inherent in the conventional back pressure valve.

Another object of the present invention is to provide a back pressure valve which minimizes occurrence of trouble due to clogging by contamination though it is simple in constructure and inexpensive.

Still other objects of the present invention will be apparent from the following description.

SUMMARY OF THE INVENTION

According to the present invention, the above-described objects are achieved by a back pressure valve comprising:

a casing having a chamber formed therein, which chamber is communicating with an inlet port and an outlet port;

a piston which is slidably installed in the casing;

an elastic member which urges the piston toward the inlet port; and a relief valve which opens when pressure in the chamber exceeds a predetermined pressure level so as to permit flow of fluid from the inlet portion to the outlet port, which valve further comprises:

a cylindrical piston which is slidably inserted between an outer periphery of the piston and an inner periphery of the casing; and an outer elastic member which urges the cylindrical piston toward the inlet port.

Operation

According to the present invention, when fluid flows into the chamber through the inlet port, both the piston and the cylindrical piston move toward the outlet port against the elastic member and the outer elastic member. Thus, a predetermined amount of fluid is accumulated in the chamber. Under this condition, when the pressure in the chamber increases above a predetermined level, the relief valve opens. Then, the fluid flows from the inlet port to the outlet port through the relief valve and the chamber.

When, the operation of the fluid source stops, the fluid flow into the inlet port stops. In this case, the fluid accumulated in the chamber by compression of the elastic member and the outer elastic member serves the actuator with back pressure, so that the suction of air in the actuator is prevented.

Under such circumstances, when contaminants are lodged either in a position between the piston and the cylindrical piston or in a position between the cylindrical piston and the casing, the relative movement may be prevented between the piston and the cylindrical piston or between the cylindrical piston and the casing. However, relative movement is still possible between the remaining parts, i.e., between the cylindrical piston and the casing or between the piston and the cylindrical piston. Accordingly, the fluid is fed to the actuator, and therefore, suction of air is securely prevented.

Further, the construction of the present invention is simple because only the cylindrical piston and the outer elastic member are added to perform the above-described additional function. Accordingly, the back pressure valve of the present invention is inexpensive. Besides, the size of the back pressure valve of the present invention is not increased.

BRIEF DESCRIPTION OF THE DRAWINGS

The present invention will now be explained in detail with reference to the accompanying drawings, wherein.

PREFERRED EMBODIMENT

Figure 1:
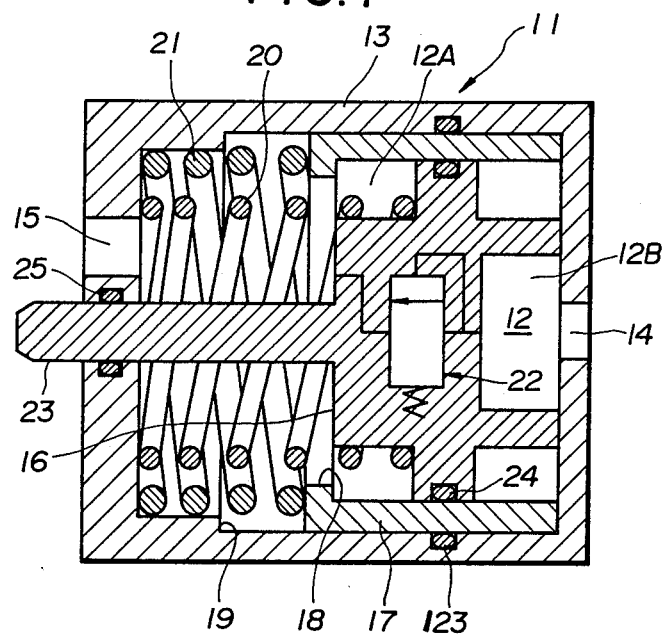
FIG. 1 is a cross sectional view of an embodiment of the present invention.
Figure 2:
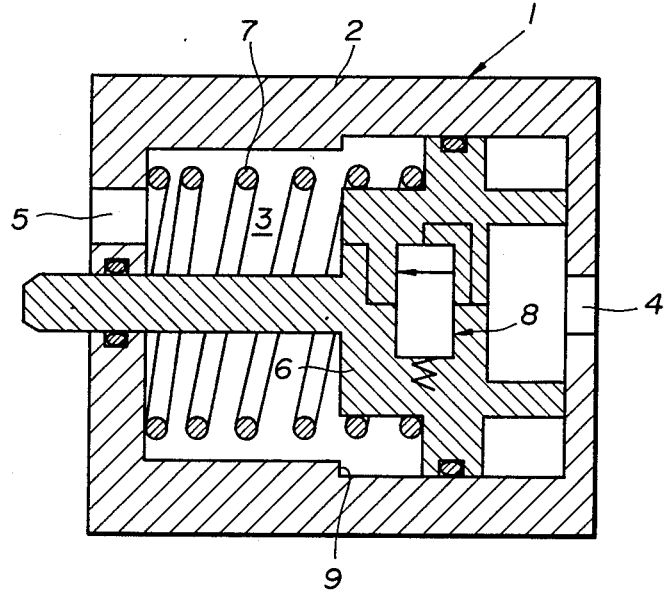
FIG. 2 is a cross sectional view of a convention back pressure valve.

Referring to FIG. 1, which illustrates an embodiment of the present invention, reference numeral 11 generally designates a back pressure valve disposed between a servo-actuator of an aircraft and an oil tank.

The back pressure valve 11 comprises a casing 13 which has a chamber 12 formed therein. The casing 13 has an inlet port 14 formed at the front end thereof and communicating with the chamber 12, and the casing 13 also has an outlet port 15 formed at the rear end thereof and communicating with the chamber 12.

A piston 16 is slidably installed in the chamber 12 of the casing 13 so as to divide the chamber into two portions 12B and 12A.

A cylindrical piston 17 having a circular cross section is inserted between the outer periphery of the piston 16 and the inner periphery of the casing 13. The outer periphery of the cylindrical piston 17 and the inner periphery of the casing 13 are sealingly and slidably engaging with each other via a sealing member, such as an O-ring 23. Similarly, the inner periphery of the cylindrical piston 17 and the outer periphery of the piston 16 are sealingly and slidably engaging with each other via a sealing member, such as an O-ring 24. As a result, the piston 16 slidably engages with the casing 13 via the cylindrical piston 17.

The cylindrical piston 17 has an annular projection 18 of a ring type radially extending from the inner surface thereof at an end near the outlet port 15. When the piston 16 moves toward the outlet port 15, it abuts the projection 18.

Further, the casing 13 has a shoulder 19 formed at the inner rear portion thereof, on which the cylindrical piston 17 abuts.

Reference numeral 20 designates a spring, which is an embodiment of the elastic member of the present invention and which is disposed between the rear wall of the casing 13 and the piston 16. Similarly, reference 21 designates a spring, which is an embodiment of the outer elastic member of the present invention and which is disposed coaxially with the spring 20 between the rear wall of the casing 13 and the cylindrical piston 17 in such a manner that it surrounds the spring 20. The spring 20 and the outer spring 21 urge the piston 16 and the cylindrical piston 17, respectively, until they abut the front wall of the casing 13.

A relief valve, which is illustrated by a symbol and which is generally designated by reference numeral 22, is disposed in the piston 16. The relief valve 22 opens after the piston 16 and cylindrical piston 17 move backwardly against the spring forces of the spring 20 and outer spring 21 so as to accumulate within the chamber 12 a predetermined amount of fluid.

Then, the fluid flows from the inlet port 14 to the outlet port 15 thorugh the relief valve 22 and the chamber 12.

Reference numeral 23 designates an indicator rod which is formed integral with the piston 16 and which penetrates the rear wall of the casing 13 via sealing member, such as an O-ring 25. An operator knows the position of the piston 16 when he sees the amount of the indicator rod 23 projecting from the casing 13.

The operation of the embodiment of the present invention will now be explained.

It is supposed that fluid from a fluid source (not shown) flows in a servo-actuator (not shown), from which the return fluid flows in the back pressure valve 11. The fluid flows in the chamber 12 through the inlet port 14 and moves the piston 16 toward the outlet port 15, while the spring 20 is compressed. When the piston 16 engages with the annular projection 18, the piston 16 and the cylindrical piston 17 compress the spring 20 and the outer spring 21, and they move toward the outlet port 15 in one body. When the cylindrical piston 17 abuts on the shoulder 19, the movement of the piston 16 and the cylindrical piston 17 are stopped. Thus, a predetermined amount of fluid is accumulated within the casing 13. Under this condition, if the pressure in the chamber 12 enhances to a value above a predetermined level, the relief valve 22 opens. Thus, the fluid from the servo-actuator returns to the oil tank through the inlet port 14, chamber 12 and the outlet port 15.

When the operation of the fluid source stops, the relief valve 22 closes, and the pressure in the chamber 12 is applied to the servo-actuator as back pressure. In this instance, if the piston rod of the servo-actuator moves because of, for example, occasional external force effecting on the servo-actuator, the servo-actuator may suck air therein. However, as described above, the back pressure is applied to the servo-actuator from the back pressure valve 11, the fluid having been accumulated in the chamber 12 is supplied to the servo-actuator instead of the air. Thus, suction of air is completely prevented.

The piston 16 and the cylindrical piston 17 are urged by the spring 20 and the outer spring 21, respectively, and move toward the inlet port 14 by distances corresponding to the above-described supplemented amount, respectively, during the above-described operation.

Under this condition, if contaminants contained in fluid are lodged between the piston 16 and the cylindrical piston 17, the relative movement between the piston 16 and the cylindrical piston 17 becomes impossible. However, since the relative movement between the cylindrical piston 17 and the casing 13 is possible, the cylindrical piston 17, which is pressed by the outer spring 21, is moved so that the fluid is supplemented with the servo-actuator.

In the meantime, if contaminants are lodged between the cylindrical piston 17 and the casing 13, the piston 16, which is pressed by the spring 20, is moved so that fluid is supplemented with the servo-actuator.

As described above, when contaminants are lodged either in a position between the piston 16 and the cylindrical piston 17 or in a position between the cylindrical piston 17 and the casing 13, the servo-actuator is supplied with fluid from the back pressure valve. Accordingly, suction of air is securely prevented.

One cylindrical piston 17 is disposed between the piston 16 and the casing 13 in the above-described embodiment. However, the number of the cylindrical pistons may be more than two. In this case, outer elastic members are necessary for the respective cylindrical pistons.

Further, the indicator rod 23 is formed on the piston 16 in the above-described embodiment, the indicator rod 23 may be formed on the cylindrical piston 17.

ADVANTAGES OF THE INVENTION

As described above, the construction of the present invention is simple because only the cylindrical piston and the outer elastic member are added to a conventional back pressure valve so as to perform the above-described additional function. Accordingly, the back pressure valve of the present invention is inexpensive. Besides, the size of the back pressure valve of the present invention is not enhanced. Thus, a back pressure valve according to the present invention minimizes occurrence of trouble due to clogging of contaminations though it is simple in construction and inexpensive.

What is claimed is:

1. A back pressure valve comprising:
   a casing having a chamber formed therein, which chamber is communicating with an inlet pot and an outlet port;
   a piston which is slidably installed in said casing to divide said chamber into two sub-chambers communicating with said inlet port and outlet port, respectively, and which receives pressure from said inlet port and said outlet port on both sides thereof, respectively;
   an elastic member which is installed in said sub-chamber communicating with said outlet port and which urges said piston toward said inlet port;
   a relief valve formed in said piston and which opens when pressure in said sub-chamber communicating with said inlet port exceeds a predetermined pressure level so as to permit flow of fluid from said inlet pot to said outlet port;
   a cylindrical piston which is slidably inserted between an outer periphery of said piston and an inner periphery of said casing and which is exposed to said sub-chamber communicating with said outer port; and
   an outer elastic member which is installed in said sub-chamber communicating with said outlet port and which urges said cylindrical piston toward said inlet port.

2. A back pressure valve according to claim 1 wherein said cylindrical piston has a shoulder formed on the inside thereof to restrict movement of said piston toward said outlet port.

* * * * *